(12) United States Patent
Tiirola et al.

(10) Patent No.: US 9,998,258 B2
(45) Date of Patent: Jun. 12, 2018

(54) METHOD OF SCHEDULING DATA

(75) Inventors: Esa Tapani Tiirola, Kempele (FI);
Kari Pekka Pajukoski, Oulu (FI);
Kari Juhani Hooli, Oulu (FI); Peng Chen, Beijing (CN); Chun Yan Gao, Beijing (CN)

(73) Assignee: Nokia Solutions and Networks Oy, Espoo (FI)

( * ) Notice: Subject to any disclaimer, the term of this patent is extended or adjusted under 35 U.S.C. 154(b) by 0 days. days.

(21) Appl. No.: 13/257,113

(22) PCT Filed: Mar. 18, 2009

(86) PCT No.: PCT/EP2009/053214
§ 371 (c)(1),
(2), (4) Date: Jan. 13, 2012

(87) PCT Pub. No.: WO2010/105680
PCT Pub. Date: Sep. 23, 2010

(65) Prior Publication Data
US 2012/0113913 A1    May 10, 2012

(51) Int. Cl.
*H04W 4/00* (2018.01)
*H04L 1/16* (2006.01)
*H04L 1/18* (2006.01)
*H04L 5/00* (2006.01)
*G08C 17/00* (2006.01)
*H04B 7/208* (2006.01)
*H04W 72/00* (2009.01)
(Continued)

(52) U.S. Cl.
CPC .................. *H04L 1/16* (2013.01); *H04L 1/18* (2013.01); *H04L 1/1829* (2013.01); *H04L 5/0053* (2013.01)

(58) Field of Classification Search
CPC . H04L 1/16; H04L 1/18; H04L 1/1829; H04L 5/0053
USPC .............. 370/311, 329, 344; 455/452.2, 561, 455/562.1; 714/755
See application file for complete search history.

(56) References Cited

U.S. PATENT DOCUMENTS 5,778,324 A * 7/1998 Smith .................. 455/562.1
6,311,074 B1 * 10/2001 Luders ................. 455/561
(Continued)

FOREIGN PATENT DOCUMENTS

CN          201004702 Y    1/2008
WO     WO 2007148710 A1   12/2007
WO     WO 2009/025510 A1   2/2009

OTHER PUBLICATIONS

R1-091275, 3GPP TSG RAN WG1 Meeting #56bis, "PUCCH Design for Carrier Aggregation", Huawei, Mar. 23-27, 2009, Seoul, Republic of Korea, 8 pgs.
(Continued)

*Primary Examiner* — Mahmoud S Ismail
(74) *Attorney, Agent, or Firm* — Harrington & Smith

(57) ABSTRACT

A method of transmitting uplink control signals/status bits from a user equipment, said user equipment having multiple transmit antennae, and said control signals correspond to a plurality of previous downlink transmissions, wherein said control signals are transmitted over a plurality of PUCCH resources and over said multiple antennae, and transmitted during a single uplink sub-frame. Use of multiple PUCCH resources and multiple antennae allow greater spatial diversity.

30 Claims, 11 Drawing Sheets

(51) Int. Cl.
*H04B 1/38* (2015.01)
*H04M 1/00* (2006.01)

(56) References Cited

U.S. PATENT DOCUMENTS

| | | | | |
|---|---|---|---|---|
| 8,041,364 | B2* | 10/2011 | Wu et al. | 455/452.2 |
| 2009/0019334 | A1* | 1/2009 | Tomlinson et al. | 714/755 |
| 2010/0246463 | A1* | 9/2010 | Papasakellariou et al. | 370/311 |
| 2011/0002322 | A1* | 1/2011 | Kim | H04J 11/0023 370/344 |
| 2011/0274024 | A1* | 11/2011 | Liu | H04L 1/1861 370/311 |
| 2012/0063400 | A1* | 3/2012 | Papasakellariou | H04L 1/1607 370/329 |
| 2014/0226591 | A1* | 8/2014 | Han et al. | 370/329 |

OTHER PUBLICATIONS

R1-091280, 3GPP TSG RAN WG1 Meeting #56bis, "Transmit Diversity Scheme for PUCCH in LTE-A", Huawei, Mar. 23-27, 2009. Seoul, republic of Korea, 3 pgs.

R1-091497, 3GPP TSG RAN1 #56-BIS, "Grouped and Encoded Packet Based HARQ for LTE-Advanced", Fujitsu, Mar. 23-27, 2009. Seoul, republic of Korea, 9 pgs.

R1-091374, 3GPP TSG-RAN WG1#56-BIS, "Evaluation of Transmit Diversity for PUCCH in LTE-A", Nortel, Mar. 23-27, 2009. Seoul, republic of Korea, 10 pgs.

R1-091173, 3GPP TSG Ran WG1 Meeting #56bis, "Performance Comparison of TxD Schemes for PUCCH", Panasonic, Mar. 23-27, 2009. Seoul, republic of Korea, 5 pgs.

R1-090786, 3GPP TSG RAN WG1 #56, "PUCCH TxD Schemes for LTE-A", LG Electronics, Feb. 9-13, 2009, Athens, Greece, 6 pgs.

ZTE: "Uplink Control Channel Design for LTE-Advanced"; 3GPP Draft; R1-091427 Uplink Control Channel Design for LTE-A; 3rd Generation Partnership Project (3GPP), Mobile Competence Centre; 650, Route des Lucioles; F-06921 Sophia-Antipolis Cedex; France; no. Seoul, Korea; Mar. 17, 2009, Mar. 17, 2009 (Mar. 17, 2017), XP050339006; [retrieved on Mar. 17, 2009] the whole document.

3GPP TS 36.213 V8.5.0 (Dec. 2008); 3rd Generation Partnership Project; Technical Specification Group Radio Access Network; Evolved Universal Terrestrial Radio Access (E-UTRA); Physical layer procedures (Release 8) ; 3rd Generation Partnership Project (3GPP), Mobile Competence Centre; 650, Route des Lucioles; F-06921 Sophia-Antipolis Cedex; France; pp. 1-74.

* cited by examiner

Figure 3

| PUCCH Formats | Control type | Modulation (data part) | Bit rate (raw bits/subframe) | Multiplexing capacity [UEs/RB] |
|---|---|---|---|---|
| PUCCH Format 1 | Scheduling request | unmodulated | - (on/off keying) | [36, 18*, 12] |
| PUCCH Format 1a | 1-bit ACK/NACK | BPSK | 1 | [36, 18*, 12] |
| PUCCH Format 1b | 2-bit ACK/NACK | QPSK | 2 | [36, 18*, 12] |
| PUCCH Format 2 | CQI | QPSK | 20 | [12, 6*, 4] |
| PUCCH Format 2a | CQI + 1-bit ACK/NACK | QPSK | 21 | [12, 6*, 4] |
| PUCCH Format 2b | CQI + 2-bit ACK/NACK | QPSK | 22 | [12, 6*, 4] |

*) typical value

Figure 4

Format 1/1a/1b channelization within one resource block, Delta_shift=2, normal CP.

| Cyclic shift | Orthogonal cover code | | |
|---|---|---|---|
| | 0 | 1 | 2 |
| 0 | 0 | | 12 |
| 1 | | 6 | |
| 2 | 1 | | 13 |
| 3 | | 7 | |
| 4 | 2 | | 14 |
| 5 | | 8 | |
| 6 | 3 | | 15 |
| 7 | | 9 | |
| 8 | 4 | | 16 |
| 9 | | 10 | |
| 10 | 5 | | 17 |
| 11 | | 11 | |

Figure 5

|          | Ch_00 | Ch_01 |
|----------|-------|-------|
| DTX, DTX | N/A   | N/A   |
| NAK, DTX | $j$   | N/A   |
| ACK, DTX | $-j$  | N/A   |
| DTX, NAK | N/A   | $j$   |
| DTX, ACK | N/A   | 1     |
| NAK, NAK | N/A   | $j$   |
| NAK, ACK | N/A   | 1     |
| ACK, NAK | $-j$  | N/A   |
| ACK, ACK | N/A   | -1    |

(PRIOR ART)

|          | Ant. Group. 0 | | Ant. Group. 1 | |
|----------|---------|-------|---------|-------|
|          | Ch_00** | Ch_01 | Ch_10 | Ch_11 |
| DTX, DTX | N/A     | N/A   | N/A   | N/A   |
| NAK, DTX | $j$     | N/A   | $j$   | N/A   |
| ACK, DTX | $-j$    | N/A   | $-j$  | N/A   |
| DTX, NAK | N/A     | $j$   | N/A   | $j$   |
| DTX, ACK | N/A     | $-j$  | N/A   | $-j$  |
| NAK, NAK | 1       | N/A   | N/A   | 1     |
| NAK, ACK | 1       | N/A   | N/A   | -1    |
| ACK, NAK | -1      | N/A   | N/A   | 1     |
| ACK, ACK | -1      | N/A   | N/A   | -1    |

(EMBODIMENT OF INVENTION)

**Ch yx: PUCCH Format 1/1a/1b channel corresponding to xth subframe/CC and yth transmit antenna group

Figure 6:

Table 6a Channel selection for ACK/NAK bundling (single code-word case)

| HARQ-ACK-CW(0) | | | $n^{(1)}_{PUCCH,Ant\#0}, n^{(1)}_{PUCCH,Ant\#1}$ | $b(0)$ |
|---|---|---|---|---|
| DTX (*UE received nothing*) | | | DTX, DTX | N/A |
| *At least 2 PUCCH channels are available* | DTX (*DL grant missing exists*) | | $n^{(1)}_{PUCCH,n(1)}, n^{(1)}_{PUCCH,n(2)}$ | 0 |
| | *Only 1 PUCCH channel is available* | NAK | $n^{(1)}_{PUCCH,n(1)}, n^{(1)}_{PUCCH,n(1)}$ | 0 |
| | | ACK | $n^{(1)}_{PUCCH,n(1)}, n^{(1)}_{PUCCH,n(1)}$ | 1 |

Table 6b: Channel selection for ACK/NAK bundling (implementation 1, multiple code-words case)

| HARQ-ACK-CW(0), HARQ-ACK-CW(1) | | | $n^{(1)}_{PUCCH,Ant\#0}, n^{(1)}_{PUCCH,Ant\#1}$ | $b(0), b(1)$ |
|---|---|---|---|---|
| DTX, DTX (*UE received nothing*) | | | DTX, DTX | N/A |
| *At least 2 PUCCH channels are available* | DTX, DTX (*DL grant missing exists*) | | $n^{(1)}_{PUCCH,n(1)}, n^{(1)}_{PUCCH,n(2)}$ | 1, 0 |
| | *Only 1 PUCCH channel is available* | NAK, NAK | $n^{(1)}_{PUCCH,n(1)}, n^{(1)}_{PUCCH,n(1)}$ | 0, 0 |
| | | NAK, ACK | $n^{(1)}_{PUCCH,n(1)}, n^{(1)}_{PUCCH,n(1)}$ | 0, 1 |
| | | ACK, NAK | $n^{(1)}_{PUCCH,n(1)}, n^{(1)}_{PUCCH,n(1)}$ | 1, 0 |
| | | ACK, ACK | $n^{(1)}_{PUCCH,n(1)}, n^{(1)}_{PUCCH,n(1)}$ | 1, 1 |

Figure 7

Table 6c: Channel selection for ACK/NAK bundling (implementation 2, multiple code-words case)

| HARQ-ACK-CW(0), HARQ-ACK-CW(1) | | $n^{(1)}_{PUCCH,Ant\#0}$, $n^{(1)}_{PUCCH,Ant\#1}$ | $b(0), b(1)$ |
|---|---|---|---|
| DTX, DTX (*UE received nothing*) | | DTX, DTX | N/A |
| At least 2 PUCCH channels are available | DTX, DTX (*DL grant missing exists*) | $n^{(1)}_{PUCCH,n(1)}$, $n^{(1)}_{PUCCH,n(2)}$ | 1, 0 |
| | NAK, NAK | $n^{(1)}_{PUCCH,n(1)}$, $n^{(1)}_{PUCCH,n(2)}$ | 0, 1 |
| | NAK, ACK | $n^{(1)}_{PUCCH,n(1)}$, $n^{(1)}_{PUCCH,n(1)}$ | 0, 1 |
| | ACK, NAK | $n^{(1)}_{PUCCH,n(1)}$, $n^{(1)}_{PUCCH,n(1)}$ | 1, 0 |
| | ACK, ACK | $n^{(1)}_{PUCCH,n(1)}$, $n^{(1)}_{PUCCH,n(1)}$ | 1, 1 |

Figure 8

Transmission of ACK/NAK multiplexing for $M = 2$

| HARQ-ACK(0), HARQ-ACK(1) | | $n^{(1)}_{PUCCH,Ant\#0}, n^{(1)}_{PUCCH,Ant\#1}$ | $b(0), b(1)$ |
|---|---|---|---|
| NAK/DTX, NAK/DTX | NAK/DTX, NAK/DTX | DTX, DTX | N/A |
| ACK, NAK/DTX | ACK, NAK | $n^{(1)}_{PUCCH,0}, n^{(1)}_{PUCCH,0}$ | 0, 0 |
|  | ACK, DTX |  | 1, 1 |
| NAK/DTX, ACK | NAK, ACK | $n^{(1)}_{PUCCH,1}, n^{(1)}_{PUCCH,1}$ | 0, 0 |
|  | DTX, ACK |  | 1, 1 |
| ACK, ACK | ACK, ACK | $n^{(1)}_{PUCCH,0}, n^{(1)}_{PUCCH,1}$ | 0, 1 |

Transmission of ACK/NAK multiplexing for $M = 3$

| HARQ-ACK(0), HARQ-ACK(1), HARQ-ACK(2) | | $n^{(1)}_{PUCCH,Ant\#0}, n^{(1)}_{PUCCH,Ant\#1}$ | $b(0), b(1)$ |
|---|---|---|---|
| NAK/DTX, NAK/DTX, NAK/DTX | NAK/DTX, NAK/DTX, NAK/DTX | DTX, DTX | N/A |
| NAK/DTX, NAK/DTX, ACK | NAK, NAK, ACK | $n^{(1)}_{PUCCH,2}, n^{(1)}_{PUCCH,2}$ | 0, 0 |
|  | NAK, DTX, ACK |  | 0, 1 |
|  | DTX, NAK, ACK |  | 1, 0 |
|  | DTX, DTX, ACK |  | 1, 1 |
| NAK/DTX, ACK, NAK/DTX | NAK, ACK, NAK | $n^{(1)}_{PUCCH,1}, n^{(1)}_{PUCCH,1}$ | 0, 0 |
|  | NAK, ACK, DTX |  | 0, 1 |
|  | DTX, ACK, NAK |  | 1, 0 |
|  | DTX, ACK, DTX |  | 1, 1 |
| ACK, NAK/DTX, NAK/DTX | ACK, NAK, NAK | $n^{(1)}_{PUCCH,0}, n^{(1)}_{PUCCH,0}$ | 0, 0 |
|  | ACK, NAK, DTX |  | 0, 1 |
|  | ACK, DTX, NAK |  | 1, 0 |
|  | ACK, DTX, DTX |  | 1, 1 |
| NAK/DTX, ACK, ACK | NAK, ACK, ACK | $n^{(1)}_{PUCCH,1}, n^{(1)}_{PUCCH,2}$ | 0, 0 |
|  | DTX, ACK, ACK |  | 1, 1 |
| ACK, NAK/DTX, ACK | ACK, NAK, ACK | $n^{(1)}_{PUCCH,0}, n^{(1)}_{PUCCH,2}$ | 0, 0 |
|  | ACK, DTX, ACK |  | 1, 1 |
| ACK, ACK, NAK/DTX | ACK, ACK, NAK | $n^{(1)}_{PUCCH,0}, n^{(1)}_{PUCCH,1}$ | 0, 0 |
|  | ACK, ACK, DTX |  | 0, 1 |
| ACK, ACK, ACK | ACK, ACK, ACK |  | 1, 1 |

Figure 9

Transmission of ACK/NAK multiplexing for $M = 4$

| HARQ-ACK(0), HARQ-ACK(1), HARQ-ACK(2), HARQ-ACK(3) | | $n^{(1)}_{PUCCH,Ant\#0}$, $n^{(1)}_{PUCCH,Ant\#1}$ | $b(0), b(1)$ |
|---|---|---|---|
| *NAK/DTX, NAK/DTX, NAK/DTX, NAK/DTX* | NAK/DTX, NAK/DTX, NAK/DTX, NAK/DTX | DTX, DTX | N/A |
| *ACK, ACK, NAK/DTX, NAK/DTX* | ACK, ACK, NAK/DTX, NAK | $n^{(1)}_{PUCCH,0}$, $n^{(1)}_{PUCCH,1}$ | 0, 0 |
| | ACK, ACK, NAK/DTX, DTX | | 0, 1 |
| *ACK, ACK, NAK/DTX, ACK* | ACK, ACK, NAK, ACK | | 1, 1 |
| | ACK, ACK, DTX, ACK | | 1, 0 |
| *ACK, NAK/DTX, ACK, NAK/DTX* | ACK, NAK, ACK, NAK/DTX | $n^{(1)}_{PUCCH,0}$, $n^{(1)}_{PUCCH,2}$ | 0, 0 |
| | ACK, DTX, ACK, NAK/DTX | | 0, 1 |
| *ACK, NAK/DTX, ACK, ACK* | ACK, NAK, ACK, ACK | | 1, 1 |
| | ACK, DTX, ACK, ACK | | 1, 0 |
| *ACK, NAK/DTX, NAK/DTX, ACK* | ACK, DTX, DTX, ACK | $n^{(1)}_{PUCCH,0}$, $n^{(1)}_{PUCCH,3}$ | 0, 0 |
| | ACK, DTX, NAK, ACK | | 0, 1 |
| | ACK, NAK, DTX, ACK | | 1, 0 |
| | ACK, NAK, NAK, ACK | | 1, 1 |
| *NAK/DTX, ACK, ACK, NAK/DTX* | NAK/DTX, ACK, ACK, NAK | $n^{(1)}_{PUCCH,1}$, $n^{(1)}_{PUCCH,2}$ | 0, 0 |
| | NAK/DTX, ACK, ACK, DTX | | 0, 1 |
| *ACK, ACK, ACK, NAK/DTX* | ACK, ACK, ACK, NAK | | 1, 0 |
| | ACK, ACK, ACK, DTX | | 1, 1 |
| *NAK/DTX, ACK, NAK/DTX, ACK* | NAK, ACK, NAK/DTX, ACK | $n^{(1)}_{PUCCH,1}$, $n^{(1)}_{PUCCH,3}$ | 0, 0 |
| | DTX, ACK, NAK/DTX, ACK | | 0, 1 |
| *NAK/DTX, ACK, ACK, ACK* | NAK, ACK, ACK, ACK | | 1, 0 |
| | DTX, ACK, ACK, ACK | | 1, 1 |
| *NAK/DTX, NAK/DTX, ACK, ACK* | NAK/DTX, NAK, ACK, ACK | $n^{(1)}_{PUCCH,2}$, $n^{(1)}_{PUCCH,3}$ | 0, 0 |
| | NAK/DTX, DTX, ACK, ACK | | 0, 1 |
| *ACK, ACK, ACK, ACK* | | | 1, 0 |
| | ACK, ACK, ACK, ACK | | 1, 1 |
| *ACK, NAK/DTX, NAK/DTX, NAK/DTX* | ACK, NAK, NAK, NAK/DTX | $n^{(1)}_{PUCCH,0}$, $n^{(1)}_{PUCCH,0}$ | 0, 0 |
| | ACK, NAK, DTX, NAK/DTX | | 0, 1 |
| | ACK, DTX, NAK/DTX, NAK | | 1, 0 |
| | ACK, DTX, NAK/DTX, DTX | | 1, 1 |
| *NAK/DTX, ACK, NAK/DTX, NAK/DTX* | NAK/DTX, ACK, NAK, NAK | $n^{(1)}_{PUCCH,1}$, $n^{(1)}_{PUCCH,1}$ | 0, 0 |
| | NAK/DTX, ACK, DTX, NAK | | 0, 1 |
| | NAK, ACK, NAK/DTX, DTX | | 1, 0 |
| | DTX, ACK, NAK/DTX, DTX | | 1, 1 |
| *NAK/DTX, NAK/DTX, ACK, NAK/DTX* | NAK/DTX, NAK, ACK, NAK | $n^{(1)}_{PUCCH,2}$, $n^{(1)}_{PUCCH,2}$ | 0, 0 |
| | NAK/DTX, NAK, ACK, DTX | | 0, 1 |
| | NAK, DTX, ACK, NAK/DTX | | 1, 0 |
| | DTX, DTX, ACK, NAK/DTX | | 1, 1 |
| *NAK/DTX, NAK/DTX, NAK/DTX, ACK* | NAK, NAK/DTX, NAK, ACK | $n^{(1)}_{PUCCH,3}$, $n^{(1)}_{PUCCH,3}$ | 0, 0 |
| | NAK, NAK/DTX, DTX, ACK | | 0, 1 |
| | DTX, NAK, NAK/DTX, ACK | | 1, 0 |
| | DTX, DTX, NAK/DTX, ACK | | 1, 1 |

Figure 10A  Table 5d: Transmission of ACK/NAK multiplexing for $M = 5$

| HARQ-ACK(0), HARQ-ACK(1), HARQ-ACK(2), HARQ-ACK(3), HARQ-ACK(4) | | $n^{(1)}_{PUCCH,ANK0}, n^{(1)}_{PUCCH,ANK1}$ | $b(0), b(1)$ |
|---|---|---|---|
| NAK/DTX, NAK/DTX, NAK/DTX, NAK/DTX, NAK/DTX | NAK/DTX, NAK/DTX, NAK/DTX, NAK/DTX, NAK/DTX | DTX, DTX | N/A |
| ACK, ACK, NAK/DTX, NAK/DTX, NAK/DTX | ACK, ACK, NAK/DTX, NAK/DTX, NAK/DTX | $n^{(1)}_{PUCCH,0}, n^{(1)}_{PUCCH,1}$ | 0, 0 |
| ACK, ACK, NAK/DTX, ACK, NAK/DTX | ACK, ACK, NAK/DTX, ACK, NAK/DTX | | 0, 1 |
| ACK, ACK, NAK/DTX, ACK, ACK | ACK, ACK, NAK, ACK, ACK | | 1, 0 |
| | ACK, ACK, DTX, ACK, ACK | | 1, 1 |
| ACK, NAK/DTX, ACK, NAK/DTX, NAK/DTX | ACK, NAK/DTX, ACK, NAK/DTX, NAK | $n^{(1)}_{PUCCH,0}, n^{(1)}_{PUCCH,2}$ | 0, 0 |
| | ACK, NAK/DTX, ACK, NAK/DTX, DTX | | 0, 1 |
| ACK, ACK, ACK, NAK/DTX, NAK/DTX | ACK, ACK, ACK, DTX, NAK/DTX | | 1, 0 |
| | ACK, ACK, ACK, NAK, NAK/DTX | | 1, 1 |
| ACK, NAK/DTX, NAK/DTX, ACK, NAK/DTX | ACK, NAK/DTX, NAK/DTX, ACK, NAK/DTX | $n^{(1)}_{PUCCH,0}, n^{(1)}_{PUCCH,3}$ | 0, 0 |
| ACK, NAK/DTX, NAK/DTX, ACK, ACK | ACK, NAK/DTX, NAK/DTX, ACK, ACK | | 0, 1 |
| ACK, NAK/DTX, ACK, ACK, ACK | ACK, NAK, ACK, ACK, ACK | | 1, 0 |
| | ACK, DTX, ACK, ACK, ACK | | 1, 1 |
| ACK, NAK/DTX, NAK/DTX, NAK/DTX, ACK | ACK, NAK/DTX, NAK/DTX, NAK/DTX, ACK | $n^{(1)}_{PUCCH,0}, n^{(1)}_{PUCCH,4}$ | 0, 0 |
| ACK, ACK, NAK/DTX, NAK/DTX, ACK | ACK, ACK, NAK/DTX, NAK/DTX, ACK | | 0, 1 |
| ACK, ACK, ACK, NAK/DTX, ACK | ACK, ACK, ACK, NAK, ACK | | 1, 0 |
| | ACK, ACK, ACK, DTX, ACK | | 1, 1 |
| NAK/DTX, ACK, ACK, NAK/DTX, NAK/DTX | NAK/DTX, ACK, ACK, NAK/DTX, NAK/DTX | $n^{(1)}_{PUCCH,1}, n^{(1)}_{PUCCH,2}$ | 0, 0 |
| NAK/DTX, ACK, ACK, NAK/DTX, ACK | NAK/DTX, ACK, ACK, NAK/DTX, ACK | | 0, 1 |
| NAK/DTX, ACK, ACK, ACK, ACK | NAK, ACK, ACK, ACK, ACK | | 1, 0 |
| | DTX, ACK, ACK, ACK, ACK | | 1, 1 |
| NAK/DTX, ACK, NAK/DTX, ACK, NAK/DTX | NAK, ACK, NAK/DTX, ACK, NAK/DTX | $n^{(1)}_{PUCCH,1}, n^{(1)}_{PUCCH,3}$ | 0, 0 |
| | DTX, ACK, NAK/DTX, ACK, NAK/DTX | | 0, 1 |
| NAK/DTX, ACK, ACK, ACK, NAK/DTX | NAK/DTX, ACK, ACK, ACK, NAK | | 1, 0 |
| | NAK/DTX, ACK, ACK, ACK, DTX | | 1, 1 |
| NAK/DTX, ACK, NAK/DTX, NAK/DTX, ACK | NAK/DTX, ACK, NAK, NAK/DTX, ACK | $n^{(1)}_{PUCCH,1}, n^{(1)}_{PUCCH,4}$ | 0, 0 |
| | NAK/DTX, ACK, DTX, NAK/DTX, ACK | | 0, 1 |

| | | | |
|---|---|---|---|
| NAK/DTX, ACK, NAK/DTX, ACK, ACK | NAK/DTX, ACK, NAK, ACK, ACK | | 1, 0 |
| | NAK/DTX, ACK, DTX, ACK, ACK | | 1, 1 |
| NAK/DTX, NAK/DTX, ACK, ACK, NAK/DTX | NAK/DTX, NAK/DTX, ACK, ACK, NAK/DTX | | 0, 0 |
| ACK, NAK/DTX, ACK, ACK, NAK/DTX | ACK, NAK/DTX, ACK, ACK, NAK/DTX | $n_{PUCCH,2}^{(1)}$, $n_{PUCCH,3}^{(1)}$ | 0, 1 |
| ACK, ACK, ACK, ACK, NAK/DTX | ACK, ACK, ACK, ACK, NAK | | 1, 0 |
| | ACK, ACK, ACK, ACK, DTX | | 1, 1 |
| NAK/DTX, NAK/DTX, ACK, NAK/DTX, ACK | NAK/DTX, NAK, ACK, NAK/DTX, ACK | | 0, 0 |
| | NAK/DTX, DTX, ACK, NAK/DTX, ACK | $n_{PUCCH,2}^{(1)}$, $n_{PUCCH,4}^{(1)}$ | 0, 1 |
| ACK, NAK/DTX, ACK, NAK/DTX, ACK | ACK, NAK/DTX, ACK, NAK, ACK | | 1, 0 |
| | ACK, NAK/DTX, ACK, DTX, ACK | | 1, 1 |
| NAK/DTX, NAK/DTX, NAK/DTX, ACK, ACK | NAK, NAK/DTX, NAK/DTX, ACK, ACK | | 0, 0 |
| | DTX, NAK/DTX, NAK/DTX, ACK, ACK | | 0, 1 |
| NAK/DTX, NAK/DTX, ACK, ACK, ACK | NAK/DTX, NAK/DTX, ACK, ACK, ACK | $n_{PUCCH,3}^{(1)}$, $n_{PUCCH,4}^{(1)}$ | 1, 0 |
| ACK, ACK, ACK, ACK, ACK | ACK, ACK, ACK, ACK, ACK | | 1, 1 |
| ACK, NAK/DTX, NAK/DTX, NAK/DTX, NAK/DTX | ACK, NAK, NAK, NAK/DTX, NAK/DTX | | 0, 0 |
| | ACK, DTX, NAK, NAK/DTX, NAK/DTX | $n_{PUCCH,0}^{(1)}$, $n_{PUCCH,0}^{(1)}$ | 0, 1 |
| | ACK, NAK, DTX, NAK/DTX, NAK/DTX | | 1, 0 |
| | ACK, DTX, DTX, NAK/DTX, NAK/DTX | | 1, 1 |
| NAK/DTX, ACK, NAK/DTX, NAK/DTX, NAK/DTX | NAK/DTX, ACK, NAK, NAK, NAK/DTX | | 0, 0 |
| | NAK/DTX, ACK, DTX, NAK, NAK/DTX | $n_{PUCCH,1}^{(1)}$, $n_{PUCCH,1}^{(1)}$ | 0, 1 |
| | NAK/DTX, ACK, NAK, DTX, NAK/DTX | | 1, 0 |
| | NAK/DTX, ACK, DTX, DTX, NAK/DTX | | 1, 1 |
| NAK/DTX, NAK/DTX, ACK, NAK/DTX, NAK/DTX | NAK/DTX, NAK/DTX, ACK, NAK, NAK | | 0, 0 |
| | NAK/DTX, NAK/DTX, ACK, DTX, NAK | $n_{PUCCH,2}^{(1)}$, $n_{PUCCH,2}^{(1)}$ | 0, 1 |
| | NAK/DTX, NAK/DTX, ACK, NAK, DTX | | 1, 0 |
| | NAK/DTX, NAK/DTX, ACK, DTX, DTX | | 1, 1 |
| NAK/DTX, NAK/DTX, NAK/DTX, ACK, NAK/DTX | NAK, NAK/DTX, NAK/DTX, ACK, NAK | | 0, 0 |
| | DTX, NAK/DTX, NAK/DTX, ACK, NAK | $n_{PUCCH,3}^{(1)}$, $n_{PUCCH,3}^{(1)}$ | 0, 1 |
| | NAK, NAK/DTX, NAK/DTX, ACK, DTX | | 1, 0 |
| | DTX, NAK/DTX, NAK/DTX, ACK, DTX | | 1, 1 |
| NAK/DTX, NAK/DTX, NAK/DTX, NAK/DTX, ACK | NAK, NAK, NAK/DTX, NAK/DTX, ACK | | 0, 0 |
| | DTX, NAK, NAK/DTX, NAK/DTX, ACK | $n_{PUCCH,4}^{(1)}$, $n_{PUCCH,4}^{(1)}$ | 0, 1 |
| | NAK, DTX, NAK/DTX, NAK/DTX, ACK | | 1, 0 |
| | DTX, DTX, NAK/DTX, NAK/DTX, ACK | | 1, 1 |

Transmission of ACK/NAK multiplexing for $M = 2$

| HARQ-ACK(0), HARQ-ACK(1) | $n^{(1)}_{PUCCH,Ant\#0}$, $n^{(1)}_{PUCCH,Ant\#1}$ | $b(0), b(1)$ |
|---|---|---|
| DTX, DTX | DTX, DTX | N/A |
| NAK, DTX | $n^{(1)}_{PUCCH,0}$, $n^{(1)}_{PUCCH,0}$ | 0, 0 |
| ACK, DTX | $n^{(1)}_{PUCCH,0}$, $n^{(1)}_{PUCCH,0}$ | 1, 1 |
| DTX, NAK | $n^{(1)}_{PUCCH,1}$, $n^{(1)}_{PUCCH,1}$ | 0, 0 |
| DTX, ACK | $n^{(1)}_{PUCCH,1}$, $n^{(1)}_{PUCCH,1}$ | 1, 1 |
| NAK, NAK | $n^{(1)}_{PUCCH,0}$, $n^{(1)}_{PUCCH,1}$ | 0, 0 |
| NAK, ACK | $n^{(1)}_{PUCCH,0}$, $n^{(1)}_{PUCCH,1}$ | 0, 1 |
| ACK, NAK | $n^{(1)}_{PUCCH,0}$, $n^{(1)}_{PUCCH,1}$ | 1, 0 |
| ACK, ACK | $n^{(1)}_{PUCCH,0}$, $n^{(1)}_{PUCCH,1}$ | 1, 1 |

Figure 12: Transmission of ACK/NAK multiplexing for $M = 3$

| HARQ-ACK(0), HARQ-ACK(1), HARQ-ACK(2) | $n^{(1)}_{PUCCH,Ant\#0}, n^{(1)}_{PUCCH,Ant\#1}$ | $b(0), b(1)$ |
|---|---|---|
| DTX,DTX,DTX | DTX, DTX | N/A |
| NAK,DTX,DTX | $n^{(1)}_{PUCCH,0}, n^{(1)}_{PUCCH,0}$ | 0, 1 |
| ACK,DTX,DTX | $n^{(1)}_{PUCCH,0}, n^{(1)}_{PUCCH,0}$ | 1, 0 |
| DTX, NAK, DTX | $n^{(1)}_{PUCCH,1}, n^{(1)}_{PUCCH,1}$ | 0, 1 |
| DTX, ACK, DTX | $n^{(1)}_{PUCCH,1}, n^{(1)}_{PUCCH,1}$ | 1, 0 |
| DTX, DTX, NAK | $n^{(1)}_{PUCCH,2}, n^{(1)}_{PUCCH,2}$ | 0, 1 |
| DTX, DTX, ACK | $n^{(1)}_{PUCCH,2}, n^{(1)}_{PUCCH,2}$ | 1, 0 |
| NAK/DTX, NAK, NAK/DTX | $n^{(1)}_{PUCCH,1}, n^{(1)}_{PUCCH,1}$ | 0, 0 |
| NAK, ACK, DTX | $n^{(1)}_{PUCCH,1}, n^{(1)}_{PUCCH,1}$ | 0, 1 |
| ACK, NAK, DTX | $n^{(1)}_{PUCCH,1}, n^{(1)}_{PUCCH,1}$ | 1, 0 |
| ACK, ACK, NAK/DTX | $n^{(1)}_{PUCCH,1}, n^{(1)}_{PUCCH,1}$ | 1, 1 |
| NAK, DTX, NAK | $n^{(1)}_{PUCCH,0}, n^{(1)}_{PUCCH,0}$ | 0, 0 |
| NAK, NAK/DTX, ACK | $n^{(1)}_{PUCCH,0}, n^{(1)}_{PUCCH,0}$ | 0, 1 |
| ACK, NAK/DTX, NAK | $n^{(1)}_{PUCCH,0}, n^{(1)}_{PUCCH,0}$ | 1, 0 |
| ACK, NAK/DTX, ACK | $n^{(1)}_{PUCCH,0}, n^{(1)}_{PUCCH,0}$ | 1, 1 |
| ACK, ACK, ACK | $n^{(1)}_{PUCCH,2}, n^{(1)}_{PUCCH,2}$ | 0, 0 |
| DTX, NAK, ACK | $n^{(1)}_{PUCCH,2}, n^{(1)}_{PUCCH,2}$ | 0, 1 |
| NAK/DTX, ACK, NAK | $n^{(1)}_{PUCCH,2}, n^{(1)}_{PUCCH,2}$ | 1, 0 |
| NAK/DTX, ACK, ACK | $n^{(1)}_{PUCCH,2}, n^{(1)}_{PUCCH,2}$ | 1, 1 |

…

METHOD OF SCHEDULING DATA

FIELD OF INVENTION

The invention relates a method of scheduling data such as in communication systems and has particular but not exclusive application to transmitting control data in cellular communication systems.

BACKGROUND OF INVENTION

A communication system is a facility which facilitates the communication between two or more entities such as communication devices, network entities and other nodes. A communication system may be provided by one more interconnected networks. A communication device can be understood as a device provided with appropriate communication and control capabilities for enabling use thereof for communication with others parties. The communication may comprise, for example, communication of voice, electronic mail (email), text messages, data, multimedia and so on. A communication device typically enables a user of the device to receive and transmit communication via a communication system and can thus be used for accessing various service applications.

In cellular systems a network entity in the form of a base station provides a node for communication with mobile devices in one or more cells. A base station is often referred to as a 'Node B'. There are many different techniques for processing signals for transmission between the base station and the user equipment. Typically the operation of a base station apparatus and other apparatus of an access system required for the communication is controlled by a particular control entity. The control entity is typically interconnected with other control entities of the particular communication network.

A non-limiting example of a type of access architecture is a concept known as the Evolved Universal Terrestrial Radio Access (E-UTRA), which is part of the Third Generation Partnership Project Long Term Evolution (3GPP LTE) standard. Within the E-UTRA architecture, it is proposed to use Orthogonal Frequency Division Multiple Access (OFDMA) for the downlink (i.e. base station to mobile station) and Single Carrier Frequency Division Multiple Access (SC-FDMA) for the uplink (mobile station to base station). In 3GPP systems it is proposed that, in relation to general control channel structure, there will be a division between control and data, and that both use time domain multiplexing, e.g. a number of OFDM symbols in each TTI (transmission time interval) will carry the control channels for a number of user equipments (e.g. mobile/user equipment UE) for the Physical Downlink Control Channel (PDCCH), and a set of OFDM symbols will carry the shared channel for a number of users (PDSCH).

This invention relates further improvements in LTE-Advanced systems of 3GPP and more specifically to the UL control channel design.

The LTE-Advanced system is the next major step from the LTE Rel'8 system and it fulfils the requirements of the fourth generation (4G) communication network as specified by the International Telecommunications Union (ITU). SU-MIMO with up to four transmission antennas will be supported in LTE-Advanced system.

LIE-Advanced applies Rel'8 type of physical uplink control channel (PUCCH) to transmit control signals, such as an acknowledgement (ACK)/negative-ACK (NAK), a channel quality indicator (CQI) and a scheduling request (SR) indicator, from a user equipment (UE) to an evolved node B (eNB).

As far as the UL control signalling relating to systems such as the LTE-Advanced is concerned, various schemes have been proposed. From the UL coverage point of view, single-carrier transmission is the preferable solution. However there is a problem from ACK/NAK signalling point of view by taking the component carrier (CC)-specific HARQ and transport block into account. With an assumption of CC-specific HARQ/transport block there will be a need to transmit multiple ACK/NACK bits during one UL subframe. At the same time, there will be multiple PUCCH Format 1a/1b resources being reserved (assuming CC-specific PDCCH). Each of the reserved PUCCH resources is capable to transmit at most 2 ACK/NACK bits during one sub-frame. The problem is that UE cannot transmit multiple ACK/NACK bits via multiple resources in parallel without significant PAPR increase. PUCCH signalling related to Rel'8 TDD has been discussed in the prior art. However, as mentioned it does not take into account usage of multiple PUCCH resources and multiple transmit antennas at the same time.

It is an object of the invention to optimize and arrange the PUCCH transmission in the case when the UE is employed with multiple transmit antennas and more than one PUCCH Format 1a/1b. FIG. 3 shows an example of PUCCH formats.

STATEMENT OF THE INVENTION

The invention comprises a method of transmitting uplink control signals/status bits from a user equipment, said user equipment having multiple transmit antennae, and said control signals correspond to a plurality of previous downlink transmissions, wherein said control signals are transmitted over a plurality of PUCCH resources and over said multiple antennae, and transmitted during a single uplink sub-frame.

Preferably there is a one-to-one mapping between the PUCCH resources corresponding to a first transmit antenna (group) and the pre-determined downlink control channel element and; PUCCH resources corresponding the second antenna (group) are derived from PUCCH resources of the first antenna.

The control signals are represented by a codeword representing a number and/or status of control signals or bits. They may be e or more of any of the following: ACK, NACK, or DTX.

In an enhanced embodiment said control signals/status bits are sent uplink in the form of one or more codewords representing the control signals/bits and/or the number of them.

The status bits may be bundled into codewords; said codewords representing a pre-determined number and combination of status bits. The status bits/control signals are interpreted by the uplink dependent on constellation point and/or channel and/or selected PUCCH resources.

Preferably said constellation points and selected PUCCH resources corresponding to different codewords maximize the Euclidean distance when received.

Preferably each antenna has dedicated PUCCH channel. Where more than two antennae, two or more antennae may share the same channels.

Occupied PUCCH channels may be swapped between transmit antennae. Where there are more than two antennae, grouping said antennae for the purpose of assigning PUCCH resources.

The method may be part of a TDD or FDD system.

The invention also comprises a network element having means to transmit uplink control signals/status bits, said network element having multiple transmit antennae, and said control signals correspond to a plurality of previous downlink transmissions, and having means to transmit said control signals over a plurality of PUCCH resources and over said multiple antennae, during a single uplink subframe.

The invention also comprises a computer readable medium comprising a computer program thereon, said computer program performing the method of the invention as stated.

SUMMARY OF FIGURES

For a better understanding of the present invention and how the same may be carried into effect, reference will now be made by way of example only to the accompanying drawings in which:

FIG. 3 shows a table of typical PUCCH formats used in uplink control.

FIG. 4 shows a table of an exemplary channelization format.

FIG. 5 shows two tables comparing a prior art scheme and an embodiment of the invention.

FIGS. 6 and 7 show three tables illustrating channel selection for various embodiments of the invention in bundling mode.

FIGS. 8, 9 and 10 show two tables illustrating embodiments of the invention according to an enhanced "tree structure" method in multiplexing mode. FIG. 10 includes FIGS. 10A and 10B.

FIGS. 11 and 12 show two tables illustrating embodiments of the invention of an alternative method in multiplexing mode.

DESCRIPTION OF BACKGROUND TO INVENTION

Figure 1:
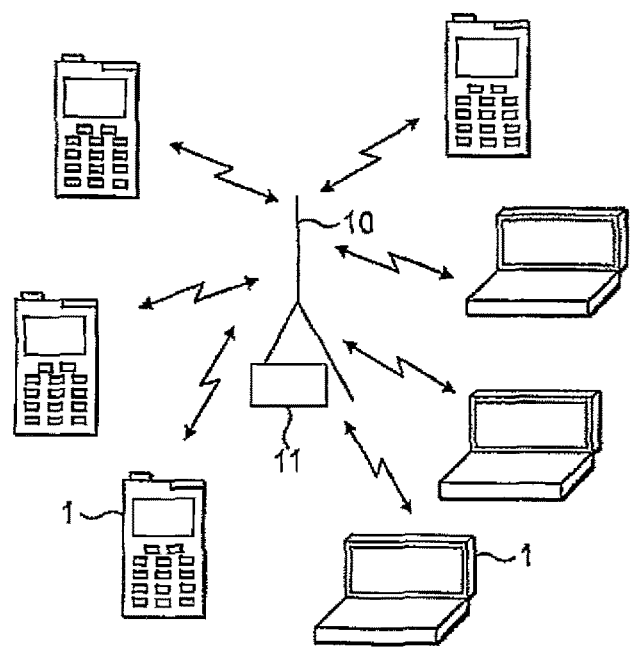
FIG. 1 shows a schematic presentation of a communication system wherein the invention may be embodied.

Before explaining in detail a few exemplifying embodiments, a brief explanation of wireless access is given with reference to FIG. 1 showing a communication system providing wireless communications to a plurality of communication devices 1. A communication device 1, for example a mobile user device, or equipment or a relay node, can be used for accessing various services and/or applications provided via the wireless communication system. A communication device can typically access wirelessly a communication system via at least one wireless transmitter and/or receiver node 10 of an access system. Non-limiting examples of access nodes are a base station of a cellular system, for example a 3G WCDMA Node B, an enhanced Node B (eNB) or relay node of 3GPP LTE (long term evolution), a base station of a wireless local area network (WLAN) and a satellite station of a satellite based communication system. The communication devices 1 may also communicate directly with each other.

The communications may be arranged in various manners based on an appropriate radio access technology or technologies. The access is provided via radio channels also known as access channels. Each communication device 1 may have one or more radio channels open at the same time.

Each communication device may be connected to more than one base station 10 or similar entity. Also, a plurality of communicate devices may communicate with a base station or similar, and/or attempt to access the communication system via the same base station. A plurality of communication devices may also share a channel. For example, to start communications or to connect to a new access system, a plurality of communications devices may attempt to make the initial contact via a single channel, for example via a random access channel (RACH). The attempts to access may be made substantially at the same time.

The base station 10 of the access system can be connected to other parts of the communication system via appropriate connections, for one or more appropriate gateway nodes. These are not shown for clarity. A base station is typically controlled by at least one appropriate controller apparatus (this is true for GSM and WCDMA. However in LTE and WiMAX there is no controller anymore, but control functionality is distributed to appropriate network elements such as general access nodes, base stations, nodeB's, eNBs, AP's) generally denoted by 11 in FIG. 1. The controller apparatus 11 can be provided for managing of the operation of the base station and/or communications via the base station. The controller apparatus is typically provided with memory capacity and at least one data processor. Various functional entities may be provided in the controller by means of the data processing capability thereof. The functional entities provided in the base station controller may provide functions relating to radio resource control, access control, packet data context control, relay control and so forth.

Network elements, such as base stations 10 are managed by using network management operations support system (OSS). OSS's role is to supporting processes such as maintaining network inventory, provisioning services, configuring network components, and managing faults. OSS architecture is based on four layers: Business Management Level (BML), Service Management Level (SML), Network Management Level (NML), Element Management Level (EML). Network elements can be managed from network management system (NMS) or element management system (EMS). Base stations 10 are connected to NMS over open Itf-N (so called northbound interface) or to EMS over proprietary Itf-S interface (southbound interface).

A communication device 1 can be used for various tasks such as making and receiving phone calls, for receiving and sending data from and to a data network and for experiencing, for example, multimedia or other content. For example, a communication device may access applications provided via a telephone network and/or a data network, such as applications that are provided based on the Internet Protocol (IP) or any other appropriate protocol. An appropriate mobile communication device may be provided by any device capable of at least sending and/or receiving wireless signals from the access system. Non-limiting examples include a mobile station (MS) such as a mobile phone or a smart phone, a portable computer provided with a wireless interface card or other wireless interface facility, personal data assistant (PDA) provided with wireless communication capabilities, or any combinations of these or the like.

Figure 2:
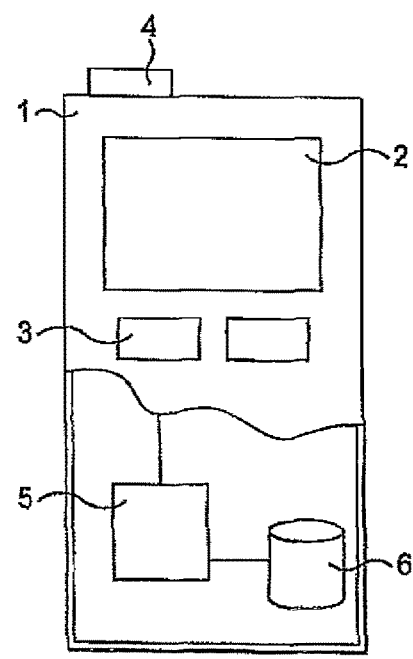
FIG. 2 shows a sectioned view of communication user equipment.

As shown in FIG. 2, a communication device 1 is typically provided with appropriate data processing apparatus, such as at least one data processor 5. At least one memory device 6 is also typically provided. The data processing and storage entities can be provided on an appropriate circuit board and/or in chipsets. Different functions and operations may be provided by different chips. Alternatively, at least partially integrated chips may be used. Antenna means 4, a display 2, and/or a keypad 3 may also be provided.

In order to maintain single-carrier properties in Rel'8 TDD, it has been proposed to PUCCH channel selection technique when signalling multiple ACK/NACK bits per UL sub-frame. In LTE Rel'8 TDD, in the case of asymmetric DL/UL configuration, the UE has the possibility to report ACK/NAK associated with multiple DL sub-frames during one UL sub-frame. The ACK/NAK signalling for multiple DL sub-frames can be made using either ACK/NAK bundling or ACK/NAK multiplexing mode.

Control bits can also be bundled. The term bundling corresponds to providing a codeword or one or more bits representing a plurality of ACK/NACK/DTX bits. In the ACK/NAK bundling mode, the ACK/NAK bits are first bundled in time domain to get one bit (or 2 bits with Multiple Codewords (MCW) DL transmission), modulated and then transmitted on the PUCCH channel corresponding to the last detected DL grant. In other words ACK/NACK bundling may correspond to having logical-AND operation for multiple-ACK/NACK bits)

In the ACK/NAK multiplexing mode, channel selection is used which enables transmission of 2-4 bits via single PUCCH channel. The selected channel and the used QPSK constellation point are determined based on the ACK/NAK/DTX states for the multiple DL sub-frames as exemplified by tables 10.I-2, 10.1-3, and 10.1-4 of 3GPP TS36.213 v850.

The problem solved by the invention relates to the question of how to optimise and arrange the PUCCH transmission in the case when the UE is employed with multiple transmit antennas (or more generally where multiple PUCCH channels are used in parallel) and more than one PUCCH Format 1a/1b resource is available. In general throughout this specification, a PUCCH resource may be and is usually equivalent to a PUCCH channel. In LTE Rel'8 there is a one-to-one mapping between the lowest PDCCH control channel element and the occupied PUCCH Format 1a/1b channel. This principle allows implicit resource allocation for the DL ACK/NACK transmitted in UL. It is noted that PUCCH transmit diversity schemes based on the usage of multiple PUCCH Format 1a/1b resources are getting an increased support in 3GPP.

In LTE Rel'8 TDD, ACKINAK multiplexing structure is known assuming that N parallel PUCCH channels are available for a given UL sub-frame. This situation enables to separate N×4 possible ACK/NAK/DTX combinations when using QPSK modulation and PUCCH channel selection on the available PUCCH channels. It is noted that, this design does not take into account PUCCH transmission with multiple transmit antennas.

ACK/NAK multiplexing on the PUCCH can be realized by means of channel selection technique used in Rel'8 TDD. This ensures that ACK/NAK signal consisting of multiple ACK/NAK/DTX bits is always transmitted via single PUCCH format 1a/1b resource. PUCCH Format 1/1a/1b resources are identified by a resource index. It has a predetermined PRB position, predetermined orthogonal cover code and predetermined cyclic shift. These resources are configured by means of PUCCH channelization. FIG. 4 shows an example of PRB with 18 PUCCH Format 1a/1b resources. There are 18 parallel PUCCH Format 1a/1b channels per PRB with this configuration.

However, there are two problems/limitations in this solution. First, it only considers single antenna transmission, and therefore it is sub-optimum for the cases with multiple transmit antennas. This is due to the fact that the signalling arrangement does not capitalize the entire PUCCH resource space available. Second, if TDD Rel'8 method is directly copied, then only up to 4 bits per sub-frame can be supported. So when more than 4 ACK/NAK bits per sub-frame is required an extension for the Rel'8 TDD structure will be needed.

Based on the discussion above, there is a need for an improved ACK/NAK transmission scheme for PUCCH for both FDD and TDD modes of LTE-Advanced system. The invention provides an improved ACK/NAK transmission scheme utilizing both spatial diversity and multiple PUCCH resources to transmit uplink PUCCH signals.

In the invented scheme, there may be two channels available per PDCCH/HARQ process. In prior art schemes, the setup is such that there is just one channel available per PDCCH/HARQ process. Due to the fact that in this application SU-MIMO applications are considered with at least two transmit antennas we can transmit via two channels in parallel without increase in cubic metric properties. This is not the case in Rel'8.

PUCCH signalling related to Rel'8 TDD can be seen as the prior art. However, as mentioned it does not take into account usage of multiple PUCCH resources per subframe due to multiple antennas transmission at the same time. It is assumed there would normally be N×2 channels; and also transmit via two channels during a single subframe, where N equals to the number of component carriers and/or number of subframes associated with a single uplink subframe. "M" refers to the number of component carriers and/or number of sub-frames associated with a single uplink sub-frame. It is alternatively designated "N".

An object of this invention is to provide a solution for transmitting ACK/NAK(s) signals through PUCCH format 1a/1b channels via multiple antennas with transmit antenna diversity; i.e. where signalled ACK/NACK/DTX codeword is transmitted via multiple antennas.

DESCRIPTION OF INVENTION

In a simple embodiment of the invention, a codeword corresponding to a predetermined number of ACK/NACK/DTX via multiple antennas is transmitted uplink such that at least 2 PUCCH channels are available for transmit antennas, and the selected PUCCH channels and the constellation point to be used at each transmit antenna depends on the transmitted codeword bits (these bits represent the status (ACK/NACK/DTX) from a plurality of downlink transmission; e.g. last n downlink transmissions.

A PUCCH channel and constellation point selection for multiple transmit antennas contains the information about ACK/NACK/DTX states of multiple PDCCH/PDSCH received by UE. All the information is transmitted via two PUCCH Format 1a/1b channels.

In one embodiment there is one-to-one mapping between the occupied PUCCH Format 1a/1b channel corresponding to the first transmit antenna and the lowest PDCCH control channel element. The second PUCCH Format 1a/1b channel can be derived from the occupied 1a/1b channel according to a pre-determined rule.

Mapping of codewords into pre-defined constellation points and pre-defined PUCCH channels occupied by different transmit antennas may be in preferred embodiments designed in such that the Euclidean distance between different codewords is maximized in order to maximize the ACK/NAK/DTX detection performance.

In a further preferred embodiment the NAK and DTX states may be set to share same pre-defined PUCCH channel as ACK but different pre-defined constellation points. In channel selection scheme, ACK/NAK/DTX states are distinguished by two parameters: the selected PUCCH channel and the selected constellation point. In such embodiment, NAK and DTX states may be mapped to same PUCCH channel but different constellation point. Thus NAK/DTX may be distinguished from ACK state via PUCCH channel detection. And DTX could be distinguished from NAK state via constellation point detection. This has the advantage of reducing ACK/NAK/DTX detection complexity and thus cost. In such case, one PUCCH channel per transmit antenna is employed. The combination of two selected PUCCH channels and the selected constellation point are used to indicate ACK/NAK/DTX state jointly.

According to one embodiment of the invention, PUCCH channels may be occupied by different transmit antennas relate to PDSCH codeword(s) in a DL certain component carrier and DL sub-frame.

The method can be used in TDD with a single component carrier, as well as TDD/FDD with multiple component carriers.

In yet a preferred embodiment to further optimise performance, the occupied PUCCH channels may swapped between the transmit antennas at the slot boundary. If there are 2×N PUCCH channels available; and 1×N PUCCH channels are dedicated to the first antenna and the remaining 1×N PUCCH channels are dedicated to the second antenna. Swapping at the slot boundary means that change the set of PUCCH channels between the first and the second antenna. This is tackles the problem related to power imbalance at the UE transmission antennas.

When applied to cases where there are more than two antennas employed on the UE side, in yet a further preferred embodiment all the available antennae may be divided into two groups of antennas. When a PUCCH channel is occupied by an antenna group consisting of multiple transmit antennas, appropriate beam-forming may be applied within the antenna group; such as random beam-forming (BF) or SVD-based phase beam-forming for TDD). Preferably, when a PUCCH channel is occupied by multiple antenna groups, where each group may consist of multiple transmit antennas, random BF (or SVD-based phase BF for TDD) may be applied among multiple antenna groups. Antenna grouping and/or random beam-forming weights within/among the antenna group(s) may be changed at the slot boundary. This means there is no limit to the number of PUCCH channels needed into 2×N (in order to save the PUCCH resources). In the case with more than two antennas, multiple antennas may share the same PUCCH format resource.

Channel selection can be used to support explicit DTX (i.e. DL grant missing state) indication in the ACK/NACK bundling mode. Explicit DTX detection means that DTX, i.e., failure of the PDCCH can be detected explicitly at the eNB. In opposite case DTX is mapped to NACK state. In this case eNB has no capability to separate DTX and NACL) In the case when bundled ACK/NACK is transmitted via multiple antennas, the signalling can be realized in such that the selected pair of PUCCH channels combined with selected constellation point is used to indicate the number of correctly received DL grants together with the signalled value. In the case we only utilize one channel, then we cannot utilize full power. However, in such case it is possible to go for virtualization with more than two antennae, as discussed earlier.

The "value" is the number of correctly received PDCCH seen by the UE. Each of the PDCCH can be subject to failure, i.e., eNB allocates PDCCH/PDSCH but UE does not receive PDCCH correctly. In the case of ACK/NACK bundling, if UE does not receive all the grants correctly, then it can still signal ACK in UL. This will be wrong ACK since UE does not know that some PDCCHs may have failed in radio link of bundled ACK/NACK bit(s).

Such problems can be avoided in preferred embodiments of the invention such that information about the number of received PDCCH is included the bundled ACK/NACK message in UL. eNB can then identify wheter the bundled ACK/NACK represents true ACK/NAC or not. Alternatively, UE can derive this information from the DL grant if the number of PDCCHs subject to ACK/NACK bundling is signalled in DL. In this approach, there is not need to include information about the number of detected PDCCH in UL signal.

DETAILED DESCRIPTION OF EMBODIMENTS

FIG. 5 shows two tables, which compare an embodiment of the invention in comparison with the prior art technique.

The left hand side table shows the prior art. Two control bits are selected from ACK NAK DTX. These control bits are to be sent uplink and relate to two previous downlink transmissions. In the prior art, there is only one ACK/NACK channel per PDCCH/PDSCH (N) available, N×1. In this example N=2. The right hand table is an embodiment of the invention. It should be noted that a careful design is applied when deriving the constellation point selection and PUCCH channel selection for the dual-antenna case. The first shows two PUCCH channels with a constellation point representing two control bits; the right hand side tables shows two channels for each antenna; i.e. two uplink (PUCCH) channel resources.

Because there are twice as many resources (two channels on two antennae) to transmit the same amount of information the invention enables better antenna diversity on PUCCH. All other degrees of freedoms are in use already in Rel'8 (CDM in cyclic shift domain and block domain is being applied in Rel'8).

The examples assume that M=2, where M equals to the number of component carriers (FDD/TDD) or number of sub-frames (TDD) associated with a single uplink sub-frame and it also assumes that there are two PUCCH Format 1/1a/1b resources per transmit antenna group available. The QPSK constellation points available for use are [−1, 1, −j and +j] in the cases of Rel'8 TDD and invented scheme. It is noted that the invention is not limited to QPSK constellation points within the available PUCCH resources, but any appropriate constellation points can be used.

It can be seen that, the invention has the advantage of supporting explicit DTX detection, and so NAK and DTX do not need to share same state. In addition the invention allows for optimized Euclidean distance between different states. Different states are different ACK/NACK/DTX combinations. All the A/N/D combinations are transmitted via all the transmit antennas. This maximizes the UL coverage.

ACK/NAK Bundling Mode

Bundling mode is referred to when two or more ACK/NACK/DTX signals (or bits representing them) are transmitted uplink together by means of a code word representing the individual signal bits. ACK/NACK bundling can be realized e.g. by means of logical AND-operation between multiple ACK/NACK channels. In other words ACK/NAK bundling is performed per codeword across multiple DL sub-frames or component carriers associated with a single UL sub-frame, and obtain a bundled ACK/NAK result per codeword.

In the prior art, in LTE Rel'8 TDD, if the UE detects that at least one DL grant has been missed via DAI checking. DAI is Downlink Assignment Index included in PDCCH in TDD mode, which is used to indicate the previous number of scheduled PDCCHs/PDSCHs associated with a single UL subframe. The UE shall not transmit ACK/NAK in case the UE is transmitting on PUCCH. UE will transmit nothing (DTX) in the case it is operating in bundling mode and it notes that some of the grants have failed.

For the codeword DTX, (i.e. the state where at least one DL grant has been missed), the support for ACK/NAK bundling mode can realized also by means of additional UL signaling in an embodiment of the invention. In other words ACK/NAK bundling can be supported without DAI bits. In preferred embodiments the number of received PDCCH bits in UL together with bundled ACK/NACK message is signaled. The benefit of this arrangement is that there is no need to introduce DAI bits in PDCCH in FDD mode.

In an embodiment of the invention, bundled ACK/NAK(s) are transmitted via multiple antenna groups by means PUCCH channel/constellation point selection. PUCCH channel/constellation point selection may carry information about the number of bundled DL subframes and/or status bits of e.g. ACK/NAK. As discussed earlied, in A/N bundling mode, it is important that UE and eNB have the same understanding about the number of PDCCH the bundled ACK/NACK is referring to (otherwise there will be higher layer errors) (SUBCLAIM)

The implementations examples for a channel selection method according to embodiments of the invention using bundling mode are shown in tables of FIGS. 6 and 7. According to the state of bundled ACK/NAK bit(s), the UE shall transmit $b(0)$ or $(b(0),b(1))$) these are transmitted bits to be mapped into QPSK constellation points on a given PUCCH Format 1b channel on a PUCCH resource $n_{PUCCH,Ant\#n}^{(1)}$ through antenna group #n using PUCCH format 1a or format 1b, (PUCCH channels) where $n_{PUCCH,n(1)}^{(1)}$ and $n_{PUCCH,n(2)}^{(1)}$ mean the PUCCH channel corresponding to the first CCE contained in last received DL grant and second-to-last received DL grant separately. Alternatively, assuming that implicit mapping is based on the first antenna only, then $n_{PUCCH,n(2)}^{(1)}$ may be derived from a pre-determined rule.

In the implementations, if only 1 PUCCH channel is available, but a pair of PUCCH resources available) (e.g. only 1 DL grant is received), DTX/(DTX, DTX) state (i.e. the state that at least one DL grant has been missed) and NAK/(NAK, NAK) state share same PUCCH resource/constellation point in the state mapping). And in the case of at least 2 PUCCH channels are available (e.g. at least 2 DL grants are received), explicit DTX indication can be supported.

FIGS. 6 and 7 shows various options according to different related embodiment of the invention. In all cases one control bit representing a codeword is sent uplink (via PUCCH). There may be either one or two PUCCH channels available but in all cases there are two PUCCH resources available. In other words the PUCCH resources may be PUCCH channels or PUCCH resources available on the same PUCC H channels i.e. a plurality of elements on a single channel.

Table 6c shows a similar group of scheme according to a related embodiments of the invention but in this case two codewords are sent on PUCCH by means on sending two bits. The bits are sent on the PUCCH resource indicated. The control bits representing two codewords are spread out in terms of PUCCH resources (PUCCH channel where available) and via two different antennae groups. In the tables "HARQ-ACK-CW(0), HARQ-ACK-CW(1)" mean ACK/NAK bundling results corresponding to MCW transmission in DL. In the tables "$n_{PUCCH,Ant\#0}^{(1)}$, $n_{PUCCH,Ant\#1}^{(1)}$" denotes the selected PUCCH resources for two antenna group separately. "b(0),b(1)" refers to the two bits needs to be sent on the selected PUCCH resource(s). It's noted that these two bits may correspond to the selected constellation point. N/A means "No Action". The top row HARQ refers to the additional state could be supported by this invention. b(0) may be sent on both antennas. BF or SVD-based PUCCH diversity may be performed if only one PUCCH resource is available or in the case when the number of transmit antennas is larger than 2.

As mentioned N is stated to be a PUCCH resource which can be PUCCH channel. One PUCCH resource may corresponds to one PUCCH channel.

According to the state of bundled ACK/NAK bit(s), the UE shall transmit $b(0)$ or $(b(0), b(1))$ on a PUCCH resource $n_{PUCCH,Ant\#n}^{(1)}$ through antenna group #n using PUCCH format 1a or format 1b, where $n_{PUCCH,n(1)}^{(1)}$ and $n_{PUCCH,n(2)}^{(1)}$ mean the PUCCH channel corresponding to the first CCE contained in last received DL grant and second-to-last received DL grant separately. Alternatively, assuming that implicit mapping is based on the first antenna only, then $n_{PUCCH,n(2)}^{(1)}$ may be derived from a pre-determined rule.

In theses embodiments a single bit may be transmitted in the uplink on a single (PUCCH) channel, the single bit representing the type of uplink control (HARQ) response; i, e, NAK, ACK. In example of table 6c, multiple (e.g. two) codewords are to be sent. This is achieved by sending two bits which are spread over two channels and on two separate antennae.

ACK/NAK Multiplexing Mode

Two sets of embodiments according to the invention in connection to this mode will now be detailed where ACK/NAK/DTX constellation point mapping is performed in different ways.

ACK/NAK multiplexing: in the case of multiple DL sub-frames are associated with a single UL sub-frame, one ACK/NAK result corresponding to one DL sub-frame is supported here. In other words, multiple ACK/NAK bits will be sent during one UL sub-frame, and the number of ACK/NAK bits depends on the configuration.

In the following examples only ACK/NAK multiplexing is considered however this embodiment and the invention is not limited to this.

Enhanced "Tree Structure" Multiplexing Method

In the following set of embodiments, the UE indicates DTX state by sending nothing. In the case that the feedback codeword only consists NAK and/or DTX state(s). In such method, the channel selection for multiplexed ACK-NAK is designed to enable multi-layer detection at eNB to reduce ACK/NAK detection complexity/cost. In other words, in the case that the feedback only consists NAK and/or DTX states, the UE will send nothing. Example of these are shown in the tables of FIGS. 8 to 10.

The first layer detection can be "channel detection" or "channel detection+BPSK constellation point detection" depending on M value, where M is the number of DL sub-frames associated with one UL sub-frame. The second layer detection is "first layer detection+QPSK constellation point detection" or "first layer detection+other two constellation point detection" depending on M value. Through first layer detection, eNB needs to establish whether each PDSCH (effectively downlink frames) is received successfully or not, i.e, distinguish between ACK and NAK/DTX states (Note: NAK and DTX may share same state here).

Through second layer detection, eNB may be able further distinguish between NAK and DTX states.

Various embodiments of the invention falling under this category will now be described in more detail. In the examples the number of antenna groups of the UE is two and the number of CCs within UE reception bandwidth is M. Tables C1 to show examples where M=2, 3, 4 and 5.

According to the state of multiplexed ACK/NAK bits, the UE shall transmit $_{b(0),b(1)}$ on a PUCCH resource $n_{PUCCH,Ant\#n}^{(1)}$ through antenna group #n using PUCCH format 1b, where $n_{PUCCH,k}^{(1)}$ means the PUCCH channel corresponding to the first CCE contained in PDCCH #k. The PUCCH channel is based on the first CCE of corresponding PDCCH. It's a implicit mapping between PUCCH resource and PDCCH resource and has been defined in Rel'8)

In most cases, through first layer detection, eNB can distinguish whether each PDSCH is received successfully or not, i.e, distinguish between ACK and NAK/DTX states (Note: NAK and DTX share same state here):

For 2CC case, to distinguish between ACK and NAK/DTX for the 2 CCs, there need to be 2^2=4 different status Strictly speaking, it should be various resources combinations between 2 antenna groups to indicate various ACK/NAK states); which can be well presented by choosing channel to be DTX, $n_{PUCCH,0}^{(1)}$, $n_{PUCCH,1}^{(1)}$ or ($n_{PUCCH,0}^{(1)}$, $n_{PUCCH,1}^{(1)}$).

For 3 CC case, to distinguish between ACK and NAK/DTX for the 3 CCs, 2^3=8 different status are needed, while by selecting channel to be DTX, $n_{PUCCH,0}^{(1)}$, $n_{PUCCH,1}^{(1)}$, $n_{PUCCH,2}^{(1)}$, ($n_{PUCCH,0}^{(1)}$, $n_{PUCCH,1}^{(1)}$), ($n_{PUCCH,0}^{(1)}$, $n_{PUCCH,2}^{(1)}$), ($n_{PUCCH,1}^{(1)}$, $n_{PUCCH,2}^{(1)}$), and using BPSK constellation, it provides $1+(C_3^1+C_3^2)\times 2=13$ options, which can well distinguish the 8 status. By status do you mean permutations of channels/antennae/constellation point/PUCCH resource and digit modulus that are needed to provide for variation in the codeword.

For 4 CC case, distinguish between ACK and NAK/DTX need 2^4=16 status, while channel selection and BPSK it provides $1+(C_4^1+C_4^2)\times 2=21$ options, also enough for ACK and NAK/DTX detection.

For 5 CC case, 2^5=32 status required, $1+(C_5^1+C_5^2)\times 2=31$, which can cover most cases.

In most cases, through second layer detection, NB can further distinguish between NAK and DTX:

For example by splitting 1 BPSK constellation point to be 2 QPSK constellation points, eNB can further distinguish between NAK and DTX. E.g, For 3 CC cases, by splitting 1 BPSK point to 2 QPSK points for 6 possible selected channel sets, we can get 12 additional status, which can well distinguish between NAK and DTX for 3 CCs.

Further Enhanced Method

Hereinafter will be detail yet a further enhanced method according to an embodiment of the invention with ACK/NAK multiplexing compared to TDD Rel'8. In this method, UE only send the DTX state in the case that it has received no grants (All DTX). In this method, UE will send nothing in the case that UE received nothing. For other cases, ACK/NAK feedback will always be sent. Example are shown in FIGS. 10 and 11. FIG. 10 includes FIGS. 10A and 10B.

PUCCH channel selection and constellation point mapping has been decided in such DTX is transmitted only in the case when all the PDCCHs have been failed (i.e., there is no reason to signal ACK/NACK). If UE receives nothing, nothing is to be fed-back.

Constellation points can be selected such that Euclidean distance is maximized between used states to maximize the ACK/NAK detection performance.

The advantages of the improved PUCCH format 1a/1b structure (PUCCH format type.) include the fact that additional resources can be used to increase the performance by means of increased Euclidean distance btw compared constellation points.

Further additional resources can be used to increase the capability for explicit DTX detection on the PUCCH (in many cases DTX and NAK are mapped into the same state in current Rel'8 TDD) and increase the payload for A/N multiplexing on the PUCCH. From each antenna, only single PUCCH channel is used, which enables low CM SC transmission. Enhanced mapping guarantees that antenna diversity is available when signalling the ACK/NACK/DTX codeword. The proposed signalling scheme is robust against antenna power imbalance.

The above described functions can be provided by means of appropriate software and data processing apparatus. Functions may be incorporated into any appropriate network element or management system and may be provided by means of one or more data processors. The data processor may be provided by means of, for example, at least one chip. Appropriate data processing may be provided in a processing unit provided in association with a communication device, for example a mobile station. The data processing may be distributed across several data processing modules. The above described functions may be provided by separate processors or by an integrated processor. An appropriately adapted computer program code product or products may be used for implementing the embodiments, when loaded on an appropriate data processing apparatus. The program code product for providing the operation may be stored on and provided by means of an appropriate carrier medium. An appropriate computer program can be embodied on a computer readable record medium. A possibility is to download the program code product to a communication device via a data network.

It is also noted that although certain embodiments were described above by way of example with reference to certain exemplifying architectures for wireless networks, technologies and standards, embodiments may be applied to any other suitable forms of communication systems than those illustrated and described herein.

It is also noted herein that while the above describes exemplifying embodiments of the invention, there are several variations and modifications which may be made to the disclosed solution without departing from the scope of the present invention.

The invention claimed is:

1. A method, the method comprising:
   transmitting multiple uplink status bits over a plurality of physical uplink control channel (PUCCH) resources and over more than two transmit antennas during a single uplink sub-frame; wherein the uplink status bits correspond to a plurality of previous downlink transmissions; wherein the more than two transmit antennas are divided into a first antenna group and second antenna group; wherein the first antenna group corresponds to a first PUCCH resource; and wherein the second antenna group corresponds to a second PUCCH resource, whereby said multiple uplink status bits are simultaneously transmitted using said more than two transmit antennas via said plurality of PUCCH resources;

providing a one-to-one mapping between the first PUCCH resource and a predetermined downlink control channel element; and
deriving the second PUCCH resource from the first PUCCH resource.

2. A method as claimed in claim 1 wherein the status bits are one or more of any of the following: ACK, NACK, or DTX.

3. A method as claimed in claim 1 wherein said status bits are sent uplink in the form of one or more codewords representing the status bits and/or the number of the status bits.

4. A method as claimed in claim 1 wherein the status bits are bundled into a codeword; said codeword representing a pre-determined number and combination of status bits.

5. A method as claimed in claim 1 wherein said status bits are interpreted by the uplink dependent on constellation point and/or channel and/or selected PUCCH resources.

6. A method as claimed in 5 wherein said constellation points and selected PUCCH resources corresponding to different codewords maximize the Euclidean distance when received.

7. A method as claimed in claim 1 wherein the PUCCH resources are PUCCH channels/formats.

8. A method as claimed in claim 1 wherein each antenna of the more than two transmit antennas has dedicated PUCCH channel.

9. A method as claimed in claim 1 wherein two or more transmit antennas share the same channel.

10. A method as claimed in claim 1 wherein occupied PUCCH channels are swapped between transmit antennas.

11. A method as claimed in claim 1 which is part of a TDD or FDD system.

12. A method as claimed in claim 1 adapted to maximize spatial diversity of said uplink sent status bits.

13. A network element comprising:
more than two transmit antennas;
a transmitter, operatively coupled to the more than two transmit antennas, for transmitting multiple uplink status bits, said status bits corresponding to a plurality of previous downlink transmissions, and for transmitting said status bits over a plurality of physical uplink control channel (PUCCH) resources and over said more than two transmit antennas, during a single uplink sub-frame;
wherein the more than two transmit antennas are divided into a first antenna group and second antenna group; wherein the first antenna group corresponds to a first PUCCH resource; and wherein the second antenna group corresponds to a second PUCCH resource, whereby said multiple uplink status bits are simultaneously transmitted using said more than two transmit antennas via said plurality of PUCCH resources; and
at least one processor and at least one memory including computer program code, the at least one memory and the computer program code configured, with the at least one processor, to cause the network element to perform at least the following:
providing a one-to-one mapping between the first PUCCH resource and a predetermined downlink control channel element; and
deriving the second PUCCH resource from the first PUCCH resource.

14. A network element method as claimed in claim 13 wherein the status bits are one or more of any of the following: ACK, NACK, or DTX.

15. A network element as claimed in claim 13 having means to send said status bits uplink in the form of one or more codewords representing the status bits and/or the number of the status bits.

16. A network element as claimed in claim 13 wherein said status bits are bundled into codewords; said codewords representing a pre-determined number and combination of status bits.

17. A network element method as claimed in claim 13 wherein the PUCCH resources are PUCCH channels.

18. A network element as claimed in claim 13 wherein said PUCCH resources are PUCCH formats.

19. A network element as claimed in claim 13 wherein each antenna of the more than two transmit antennas has a dedicated PUCCH channel.

20. A network element as claimed in claim 13, the at least one memory and the computer program code being further configured, with the at least one processor, to cause the network element to perform at least the following:
providing for the more than two transmit antennas to share the same channel.

21. A network element as claimed in claim 20 wherein the at least one memory and the computer program code are further configured, with the at least one processor, to cause the network element to perform said sharing using beam forming.

22. A network element as claimed in claim 13 further comprising at least one processor and at least one memory including computer program code, the at least one memory and the computer program code configured, with the at least one processor, to cause the network element to perform at least the following:
swapping occupied PUCCH channels between at least two of the more than two transmit antennas.

23. A network element as claimed in claim 13 which is part of a TDD or FDD LTE advanced system.

24. A network element as claimed in claim 13 adapted to maximize spatial diversity of said uplink sent status bits.

25. A network element as claimed in claim 13 which is a user equipment.

26. A network element adapted to receive the transmitted uplink status bits, sent according to claim 1.

27. A network element adapted to receive uplink status bits from the network element of claim 13.

28. A network element as claimed in claim 27, further comprising at least one processor and at least one memory including computer program code, the at least one memory and the computer program code configured, with the at least one processor, to cause the network element to perform at least the following:
interpreting the status bits dependent on constellation point and/or channel and/or selected PUCCH resources.

29. A non-transitory computer readable medium comprising a computer program thereon, said computer program performing the method of claim 1.

30. An apparatus comprising at least one processor and at least one memory including computer program code, the at least one memory and the computer program code being configured, with the at least one processor, to cause the apparatus to perform at least the following:
Transmitting multiple status bits over a plurality of physical uplink control channel (PUCCH) resources and over more than two transmit antennas during a single uplink sub-frame; wherein the status bits correspond to a plurality of previous downlink transmissions; wherein the more than two transmit antennas are divided into a first antenna group and second antenna group; wherein the first antenna group corresponds to a first PUCCH resource; and wherein the second antenna group corresponds to a second PUCCH resource, whereby said multiple uplink status bits are simultaneously transmitted using said more than two transmit antennas via said plurality of PUCCH resources;

providing a one-to-one mapping between the first PUCCH resource and a predetermined downlink control channel element; and deriving the second PUCCH resource from the first PUCCH resource.

* * * * *